(12) United States Patent
Concialdi

(10) Patent No.: US 6,305,509 B1
(45) Date of Patent: Oct. 23, 2001

(54) METHOD AND APPARATUS FOR ENHANCING VEHICLE BRAKING EFFICIENCY

(75) Inventor: John P. Concialdi, Redondo Beach, CA (US)

(73) Assignee: Advanced Engine Management, Inc., Hawthorne, CA (US)

( * ) Notice: Subject to any disclaimer, the term of this patent is extended or adjusted under 35 U.S.C. 154(b) by 0 days.

(21) Appl. No.: 09/497,771

(22) Filed: Feb. 4, 2000

(51) Int. Cl.$^7$ ...................................................... F16D 55/00
(52) U.S. Cl. ..................... 188/73.31; 188/73.39; 188/205 R
(58) Field of Search .................... 188/73.31, 73.39, 188/205 R, 206 A, 206 R

(56) References Cited

U.S. PATENT DOCUMENTS

| | | |
|---|---|---|
| 4,047,598 | * 9/1977 | Thrower ............................ 188/71.1 |
| 4,214,648 | 7/1980 | Kobayashi et al. . |
| 5,590,742 | 1/1997 | Gutelius . |
| 5,622,241 | 4/1997 | Null . |
| 5,836,427 | 11/1998 | Nakajima et al. . |
| 5,884,732 | 3/1999 | Anger et al. . |

* cited by examiner

Primary Examiner—Pam Rodriguez
(74) Attorney, Agent, or Firm—Liniak, Berenato, Longacre & White

(57) ABSTRACT

A method and apparatus for increasing braking efficiency of a disc type brake assembly. In a disc type brake assembly, a brake caliper adapter for mounting between the caliper assembly and steering knuckle to reposition the caliper assembly in a radial direction further away from the axis of rotation of the friction disc to accommodate the mounting of an enlarged diameter friction disc. The relocation of the caliper results in an increased braking torque and increased braking efficiency. The adapter may additionally be configured to accept a different or increased performance caliper and may accommodate longitudinal shifts of the brake caliper position.

12 Claims, 4 Drawing Sheets

METHOD AND APPARATUS FOR ENHANCING VEHICLE BRAKING EFFICIENCY

BACKGROUND OF THE INVENTION

1. Field of the Invention

The invention relates to the field of vehicle braking methods and apparatus. More specifically, the invention is a method and adapter apparatus for enhancing the braking efficiency of existing vehicle braking systems of the disc type.

2. Description of the Related Art

In the field of automotive braking a common brake type is a disc brake. In this type of brake, a rotating disc, connected to rotate at the speed of an associated wheel or axle, is engaged by a friction pad or pads pressing against opposed surfaces of the rotating disc. The pad or pads are pressed or clamped against the respective disc surfaces by an associated hydraulically, mechanically, or electrically actuated caliper. The caliper is fixed with respect to the rotation of the friction disc and is positioned in close proximity to the disc so that the friction pads travel a minimal distant prior to engagement with the disc surface.

In the case of any configuration of a disc type brake, the size of the disc (both thickness and diameter) and associated frictions pads and caliper are selected according to the anticipated service environment of the brake. A particular braking torque is necessary to stop the vehicle under control and within reasonable distances. The brake torque is developed as a function of friction, between the braking pads and the friction disc, developed at a selected distance from the rotational axis of the friction disc. Since the braking torque is created as a result of friction, heat is also created. The entire braking system converts the rotational energy of the disc into heat energy that is absorbed and dissipated through the disc and caliper to their respective mountings and ambient surrounding air or other auxiliary cooling. If the braking system is excessively used compared to its anticipated design use, the heat absorbed can lead to failure of braking.

In order to improve braking efficiency of a given braking system, the capacity of the system to create braking torque and to absorb and dissipate heat should be increased. In the automotive aftermarket field a number of brake equipment suppliers provide brake improvement kits adapted for retrofit to existing braking systems. These kits can include different friction pads or discs adapted to create more braking torque and to absorb and discard heat more effectively. The friction pads may have a higher friction co-efficient against the disc and/or the discs may be thicker, internally vented, or larger in diameter. Many of these kits often include different calipers as well. The calipers are usually designed to accommodate friction pads having a larger surface area, thicker disc and pad configurations, and/or larger diameter disc sizes.

In the situation where larger diameter discs are provided, two effects occur with respect to braking performance. One, the friction disc is physically larger and more robust and accordingly has the potential, depending on material selection, to absorb and discard more heat. Two, owing to the larger diameter, the distance from the disc rotational axis to the center of pressure of the friction pads is increased resulting in enhanced braking torque for a given level of friction pad pressure and engagement.

Many of these aftermarket brake improvement kits work to the extent the overall capacity of the brake system to absorb and discard heat is enhanced and a greater level of available brake torque is provided. However, the expense of the respective parts and labor can be quite high and the skill required to adapt the aftermarket mechanisms to the various vehicle fitments can be considerable. In addition, once the different calipers and friction pads are mounted, the various replacement parts needed as a result of ordinary wear can only be supplied according to the specifications of the particular kit installed. In these situations, the relative scarcity of parts can remove a vehicle from service for considerable periods.

SUMMARY OF THE INVENTION

The present invention is directed to an apparatus and method for enhancing braking efficiency by providing a caliper adapter that enables mounting of the brake caliper at an increased distance from the axis of rotation of the friction disc. By providing such a displaced mounting for the caliper in combination with the mounting of a larger overall diameter braking disc, greater brake torque is developed and enhanced vehicle braking efficiency is obtained. In addition, owing to the larger diameter of the friction disc, an increased capacity to absorb and discard heat is obtained.

In a preferred embodiment of the invention, the original caliper and pads supplied by the manufacturer are re-used. In accordance with this embodiment, original replacement parts can be used and original brake feel and construction is maintained. In another embodiment of the invention, higher clamping force calipers can be used in conjunction with higher performance friction pads for even greater brake torque and heat dissipation.

Other objects of the invention will become apparent to one of ordinary skill in the art upon a review of the following detailed description along with the accompanying drawings and claims that form the specification.

DETAILED DESCRIPTION OF THE PREFERRED EMBODIMENT

The method and adapter according to the present invention enhance braking efficiency of a disc type brake assembly 2 by relocating the caliper assembly 4 further from the rotational axis of a larger diameter friction disc 7a which is also fitted at the time the caliper is relocated.

Figure 1:
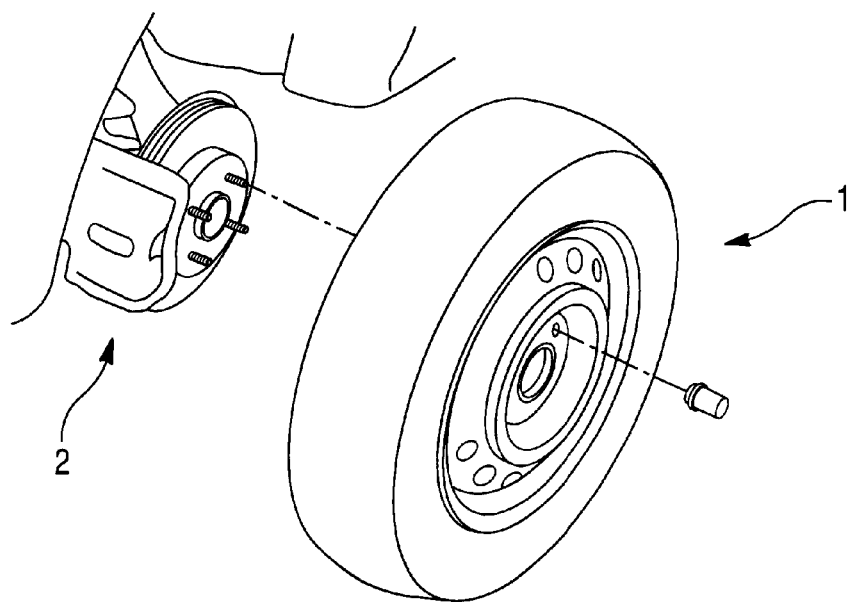
FIG. 1 illustrates the removal of the road wheel and an external view of a disc type brake assembly.
Figure 2:
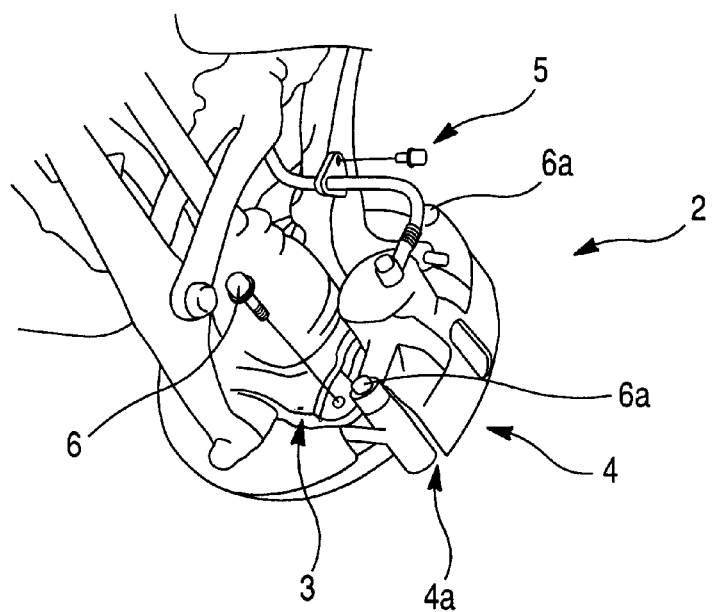
FIG. 2 shows a rear view of a disc type brake assembly with the road wheel removed.

In the present method, the first step is to immobilize and raise a wheel of the automobile corresponding to the brake assembly selected for modification. Once the roadwheel 1 is removed, as shown in FIG. 1, the brake assembly 2 is exposed for disassembly. The next step, as shown in FIG. 2, is to remove the caliper frame 4a and accompanying caliper 4 by undoing caliper bolts 6 to release the caliper 4 and frame 4a from the caliper mounting plate/steering knuckle 3. In addition, in order to obtain maximum movement capacity for the caliper, the brake line providing brake fluid to the caliper 4 should be unfastened from the associated suspension member by releasing brake line bracket bolt 5.

Figure 3:
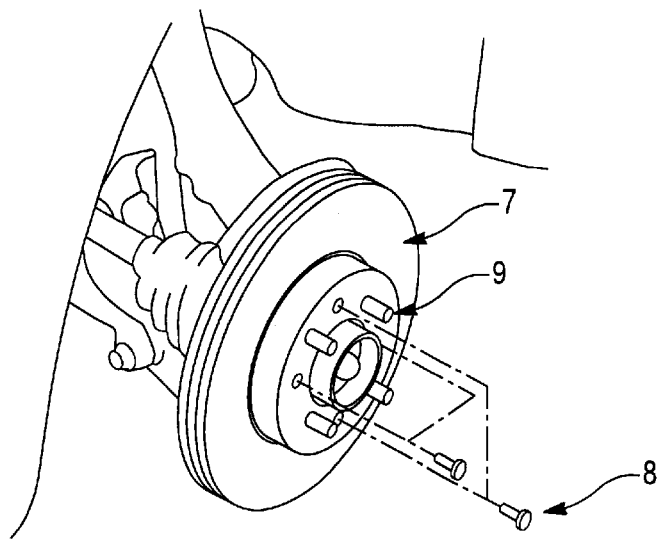
FIG. 3 shows a disc type brake assembly with the caliper and caliper frame removed.

Once the unfastened caliper is located so as not to obstruct removal of the friction disc 7, the removal thereof can be accomplished as shown in FIG. 3. The friction disc is typically attached to the wheel hub by small retaining screws 8, which are removed. Alternatively, the friction disc is held in place by friction between the inner throughbore of the friction disc and the wheel hub, or simply retained by interference with the caliper 4 and held tightly in axial alignment with the wheel hub by wheel studs 9 and the roadwheel 1.

Figure 4:
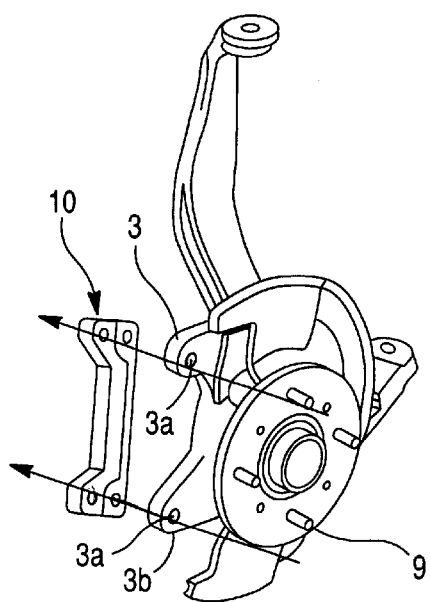
FIG. 4 shows the mounting of a caliper adapter bracket according to the present invention.

In FIG. 4 the suspension assembly is exposed and shows the outward side of the steering knuckle 3 and the attachment bores 3a for the brake caliper frame 4a. At this point in the method a caliper adapter bracket 10 according to the invention is securely bolted to the steering knuckle ears 3b through the bores 3a to the threaded bores 12 in the adapter bracket 10. The larger diameter friction disc 7a is now fitted over the wheel mounting studs 9 and on to the wheel hub. The caliper frame 4a is then bolted to the caliper adapter bracket ears 10a through smooth bores 11 of the adapter bracket. The caliper frame 4a is then refitted with friction pads 13 and the caliper 4 and any necessary retainers and shims 14. The caliper 4 is typically bolted to the caliper frame 4a using especially adapted bolts 6a. Bolts 6a typically include a fixed length of threads in combination with a smooth shank portion of a predetermined length. The smooth shank is greased lightly and enables the caliper 4 to float in an axial direction with respect to the friction disc 7 as the brake is activated and deactivated.

Figure 5:
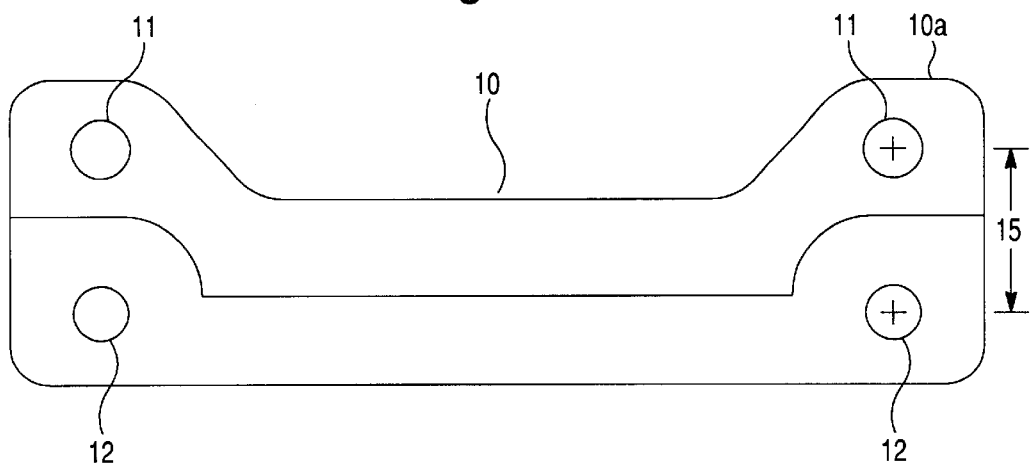
FIG. 5 shows a plan view of a caliper adapter bracket according to the present invention.
Figure 6:
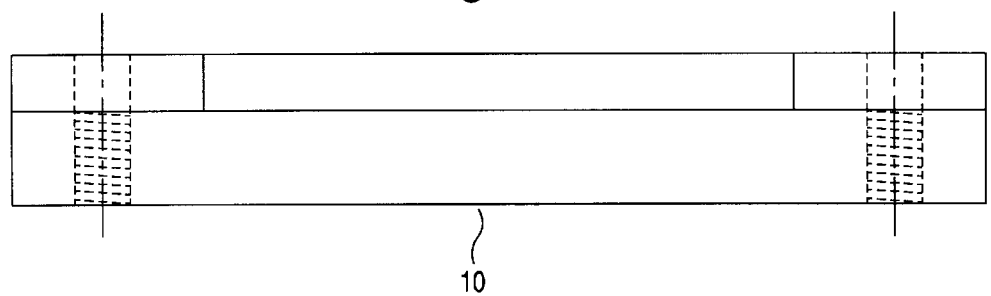
FIG. 6 shows a front horizontal view of an adapter bracket according to the present invention.
Figure 7:
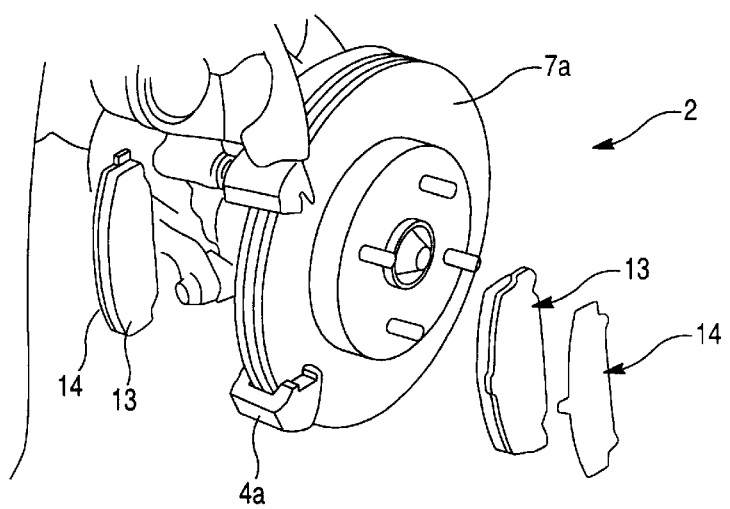
FIG. 7 shows a partially re-assembled disc brake assembly with the caliper frame in position and the friction disc fitted.

The caliper adapter bracket 10 according to the present invention, FIG. 5 and 6, includes two pairs of boltholes, 11 and 12. In the embodiment shown, one pair of the bolts holes, 11, is a smooth bore and accommodates the relatively longer bolts which pass through the adapter and connect the caliper to the ears 10a of the adapter 10. The other pair of boltholes 12 in the embodiment shown comprise a pair of threaded bores for attaching the bracket 10 to the ears 3b of the steering knuckle 3.

In the embodiment shown, the adapter 10 is configured (as shown in FIG. 5) to accommodate a steering knuckle 3 having ears 3b and bores 3a spaced according to those shown in the drawings herewith. However, as is apparent to one skilled in the art, steering knuckles and their respective end shapes and caliper mounts are cast and/or formed in variety of configurations. Some have ears, some don't, some are flat, others are notched, etc. In such instances where the shape of the steering knuckle mount for the caliper frame differs from the adapter shape shown, a re-configured adapter would have to be formed or machined to match the shape of the steering knuckle, mounting bore locations, and whether the bore is respectively threaded or smooth. The aspect of the adapter 10 that increases braking efficiency is the spacing of the centerlines 15 of the mounting bore pairs 11 and 12. This spacing reflects the distance by which the caliper 4 and caliper frame 4a assembly is moved perpendicularly with respect to the rotational axis of the friction disc 7. This distance increases the moment arm (torque arm) which results in the increased brake torque created when the relocated caliper clamps onto the larger diameter friction disc 7a.

The adapter 10 is made from any material consistent with those found in the brake assembly. Such materials would include, but not be limited to, cast iron, aluminum, magnesium, an d other suitable metals and alloys. The adapter may also be forged from suitable materials including, but not limited to, iron, aluminum, magnesium, and alloys suitable for brake assembly use. The necessary strength and resilience feature of the adapter is that is be at least as strong as the caliper and steering knuckle it attaches between in order to maintain integrity of the brake assembly through the anticipated service environment of an automobile b rake. In addition to the materials choice, machining of the adapter is usually necessary to create threads, remove casting burs, smooth mating surfaces, etc. so that a secure attachment of the adapter between the caliper assembly and steering knuckle is obtained.

In addition to the foregoing, a spacer- mounting block (not shown) may optionally be mounted between the brake line bracket and the suspension member to which the brake line is attached. The spacer block thickness should approximately correspond to the spacing 15 of the mounting bores 11 and 12 of the adapter. In this way, the relative position relationship between the brake line and the caliper can be maintained when it has been re-located in accordance with the adapter.

Figure 8:
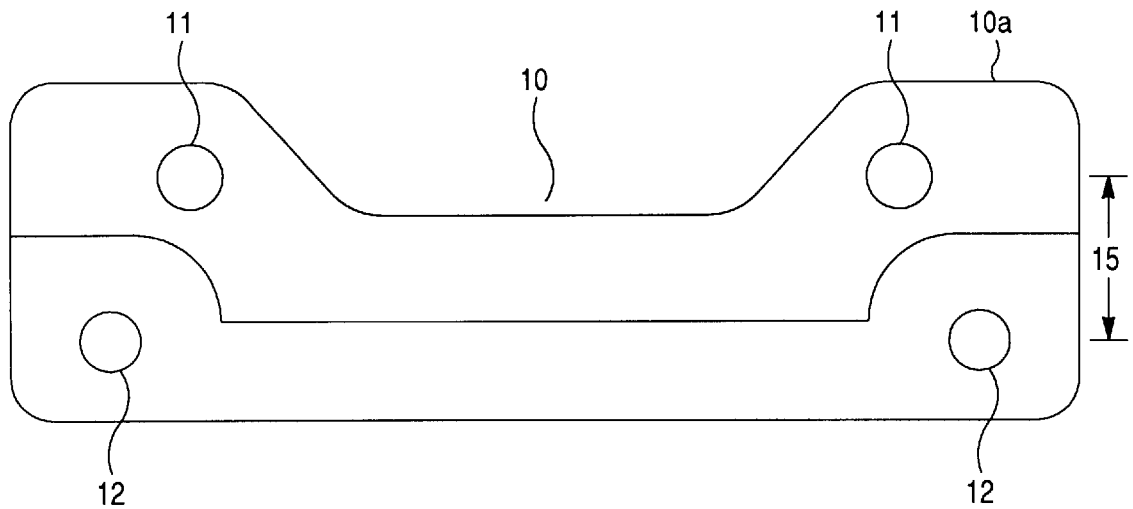
FIG. 8 shows a plan view of an alternative embodiment of an adapter bracket according to the present invention.

In a further embodiment of the method, a caliper having increased performance characteristics can replace the original equipment brake caliper. The increase in performance can be in the form of additional activation pistons within the caliper to provide a greater clamping force, increased friction pad size, and/or increased friction characteristics of the friction pads. The adapter portion that engages the caliper can be configured, as shown in FIG. 8, to accommodate a variety of caliper types and sizes according to the brake caliper chosen. In FIG. 8 the bolt hole spacing from the original caliper and the replacement caliper differ resulting in a difference in spacing between respective hole pairs 11 and 12.

The adapter can also reposition the caliper in both the radial and longitudinal directions with respect to the location of the friction disc. The adapter can reposition the caliper longitudinally as necessary to adapt the chosen replacement (OE or higher performance) caliper to the revised location of the centerline of the friction disc 7a. To fit a larger diameter friction disc, the centerline of the disc may change with respect to the original alignment of the caliper assembly attachment points. In this application, the adapter can be configured to shift the caliper in the longitudinal direction.

Figure 9:
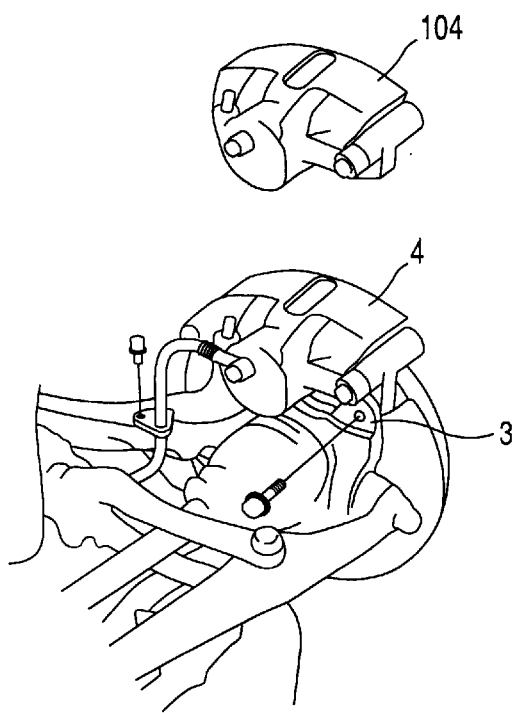
FIG. 9 shows a rear view of a disk type brake assembly with a second brake caliper to replace the existing caliper.

While specific apparatus and process have been shown and described in the foregoing specification and accompanying drawings, will be understood by those skilled the art that various modifications and changes may be made without departing from the it and scope of the invention which is only limited by the owing claims. For example, while in one embodiment, the ting caliper 4 may be reused and mounted to the adapter. In her embodiment, such as depicted in FIG. 9, a second caliper may be utilized for mounting to the adapter which is in turn ted to the suspension mount 3 thereby replacing the existing caliper 4.

What is claimed is:

1. An adapter, for relocating a brake caliper in a disc type brake assembly where said brake caliper is attached to a steering knuckle at a first fixed radial distance from an axis of rotation of a friction disc associated with said disc brake assembly, said adapter comprising:

a first body portion, said first body portion having attachment means for attaching said first body portion to said steering knuckle; and, a second body portion attached to said first body portion, said second body portion having second attachment means spaced apart a second fixed distance from said first attachment means for attaching said second body portion to said brake caliper, said first and second attachment means configured and spaced such that when said respective first and second body portions of said adapter are attached respectively to said steering knuckle and said brake caliper, said first fixed radial distance is increased by a distance corresponding to said second fixed distance.

2. An adapter as in claim 1, wherein said first and second attachment means comprise complementary bolts and bolts holes.

3. An adapter as in claim 1, wherein said first and second attachment means comprise complementary pins and bores.

4. An adapter according to claim 1, wherein said adapter is cast.

5. An adapter according to claim 1, wherein said adapter is forged.

6. An adapter, for relocating a brake caliper in a disc type brake assembly where said brake caliper is attached to a steering knuckle at a first fixed position with respect to a friction disc associated with said disc brake assembly, said adapter comprising:

a first body portion, said first body portion having attachment means for attaching said first body portion to said steering knuckle; and, a second body portion attached to said first body portion, said second body portion having second attachment means spaced apart a fixed distance from said first attachment means for attaching said second body portion to said brake caliper, said first and second attachment means configured and spaced such that when said respective first and second body portions of said adapter are attached respectively to said steering knuckle and said brake caliper, said first fixed position is displaced by an amount equal to said fixed distance and becomes a second fixed position of said caliper assembly with respect to said friction disc.

7. An adapter as in claim 6, wherein said first and second attachment means comprise complementary bolts and bolts holes.

8. An adapter as in claim 6, wherein said first and second attachment means comprise complementary pins and bores.

9. An adapter according to claim 6, wherein said adapter is cast.

10. An adapter according to claim 6, wherein said adapter is forged.

11. A method of increasing the braking efficiency of a disc type braking assembly, said assembly including a first caliper assembly, a suspension mount, wheel hub, and a first friction disc, by displacing said caliper radially outwardly with respect to an axis of rotation of said friction disc, comprising the steps of:

detaching said first caliper assembly from said suspension mount;

detaching said first friction disc from said wheel hub;

mounting an adapter, having spaced apart first and second attachment means, through said first attachment means to said suspension mount at attachment points of said caliper assembly on said suspension mount;

connecting a second caliper assembly to said adapter at said second attachment means; and, mounting a larger diameter friction disc to said wheel hub.

12. A method of increasing braking efficiency of a disc type braking assembly, said assembly including a caliper assembly directly connected to a suspension mount, a wheel hub, and a friction disc, by displacing said caliper radially outwardly with respect to an axis of rotation of said friction disc, comprising the steps:

detaching said caliper assembly from said suspension mount;

detaching said friction disc from said wheel hub;

mounting an adapter between said caliper assembly and said suspension mount, said adapter having spaced apart first and second attachment means, through said first attachment means mounting said adapter to said suspension mount at attachment points where said caliper assembly was previously connected directly thereto;

connecting said caliper assembly to said adapter at said second attachment means; and mounting a larger diameter friction disc to said wheel hub.

* * * * *